United States Patent
Zhang et al.

(10) Patent No.: US 12,513,699 B2
(45) Date of Patent: Dec. 30, 2025

(54) METHOD FOR MESSAGE TRANSMISSION, METHOD FOR MESSAGE RECEPTION, TERMINAL, AND NETWORK DEVICE

(71) Applicant: GUANGDONG OPPO MOBILE TELECOMMUNICATIONS CORP., LTD., Guangdong (CN)

(72) Inventors: Boyuan Zhang, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 314 days.

(21) Appl. No.: 18/354,916

(22) Filed: Jul. 19, 2023

(65) Prior Publication Data

US 2023/0362936 A1    Nov. 9, 2023

Related U.S. Application Data

(63) Continuation of application No. PCT/CN2021/085521, filed on Apr. 5, 2021.

(51) Int. Cl.
*H04W 72/20* (2023.01)
*H04W 72/1263* (2023.01)
*H04W 88/04* (2009.01)

(52) U.S. Cl.
CPC ....... *H04W 72/20* (2023.01); *H04W 72/1263* (2013.01); *H04W 88/04* (2013.01)

(58) Field of Classification Search
CPC . H04W 72/20; H04W 72/1263; H04W 88/04; H04W 92/18; H04B 7/15
See application file for complete search history.

(56) References Cited

U.S. PATENT DOCUMENTS

| | | | |
|---|---|---|---|
| 10,893,557 B2 * | 1/2021 | Gulati | H04B 7/15542 |
| 10,912,114 B2 * | 2/2021 | Baghel | H04W 88/04 |
| 11,089,576 B2 * | 8/2021 | Kuang | H04W 72/20 |
| 11,102,704 B2 * | 8/2021 | Tao | H04B 7/14 |
| 11,219,054 B2 * | 1/2022 | Gulati | H04W 72/23 |
| 11,246,186 B2 * | 2/2022 | Xu | H04W 72/51 |
| 11,805,464 B2 * | 10/2023 | Tang | H04W 28/065 |
| 12,238,619 B2 * | 2/2025 | Liu | H04L 61/103 |

(Continued)

FOREIGN PATENT DOCUMENTS

| | | |
|---|---|---|
| CN | 101425884 | 5/2009 |
| CN | 101741693 | 6/2010 |

(Continued)

OTHER PUBLICATIONS

Mediatek Inc., "Architecture options for Sidelink Relay," 3GPP TSG-RAN WG2 Meeting #111 electronic, R2-2006572, Aug. 2020.

(Continued)

*Primary Examiner* — Mounir Moutaouakil
(74) *Attorney, Agent, or Firm* — Hodgson Russ LLP

(57) ABSTRACT

A method for message transmission, a method for message reception, a terminal, and a network device are provided. The method includes forwarding an uplink (UL) message carried on a common control channel (CCCH) to a network device. The UL message does not include a destination layer-2 identifier (ID), and the destination layer-2 ID indicates identity of a remote terminal.

10 Claims, 5 Drawing Sheets

(56) References Cited

U.S. PATENT DOCUMENTS

| | | | |
|---|---|---|---|
| 12,255,972 B2* | 3/2025 | Merwaday | H04W 8/082 |
| 2019/0029061 A1 | 1/2019 | Feng | |

FOREIGN PATENT DOCUMENTS

| | | |
|---|---|---|
| CN | 110944406 | 3/2020 |
| WO | 2017166138 | 10/2017 |

OTHER PUBLICATIONS

Qualcomm Incorporated, "UE-to-network relay architecture and procedures," 3GPP TSG RAN WG2 Meeting #111-e, R2-2006555, Aug. 2020.

CATT, "User and Control Plane Procedures for L2 UE-to-NW Relay," 3GPP TSG-RAN WG2 Meeting #111-e, R2-2006610, Aug. 2020.

ZTE Corporation et al., "Discussion on NR SL Relay Architecture," 3GPP TSG RAN WG2 Meeting #111 electronic, R2-2006737, Aug. 2020.

AT&T, "Mechanisms for supporting L2-based Sidelink Relays," 3GPP TSG-RAN WG2 Meeting #111 electronic, R2-2006962, Aug. 2020.

Huawei et al., "Study aspects of UE-to-Network relay and solutions for L2 relay," 3GPP TSG-RAN WG2 Meeting #111-e, R2-2008047, Aug. 2020.

Samsung, "Report from session on LTE V2X and Nr V2X," 3GPP TSG-RAN WG2 Meeting #108, R2-1916288, Nov. 2019.

Huawei et al., "Analysis of L2 Segmentation and Concatenation in NR," 3GPP TSG-RAN WG2 Meeting #95bis, R2-166196, Oct. 2016.

WIPO, International Search Report and Written Opinion for International Application No. PCT/CN2021/085521, Jan. 6, 2022.

Huawei et al., "Adaptation layer based L2 relaying and light L2 relaying," 3GPP TSG-RAN WG3 #99 R3-180814, Feb. 26-Mar. 2, 2018, Athens, Greece.

EPO, Extended European Search Report issued for EP Application No. 21935477.6, Feb. 23, 2024.

* cited by examiner

METHOD FOR MESSAGE TRANSMISSION, METHOD FOR MESSAGE RECEPTION, TERMINAL, AND NETWORK DEVICE

CROSS-REFERENCE TO RELATED APPLICATION(S)

This application is a continuation of International Application No. PCT/CN2021/085521, filed Apr. 5, 2021, the entire disclosure of which is incorporated herein by reference.

TECHNICAL FIELD

The present disclosure relates to the field of wireless communications, and in particular, to a method for message transmission, a method for message reception, a terminal, and a network device.

BACKGROUND

A sidelink (SL) technology is a near field communication technology for performing information direct connection between terminals (i.e., user equipment (UE)) through a PC5 interface, and can implement network relay, that is, message transmission between a remote terminal and a network device can be realized through forwarding by a relay terminal.

In the above layer-2 based network relay scheme, for a message carried on a common control channel (CCCH) and to be transmitted between a relay terminal and a network device, during downlink (DL) transmission, the relay terminal needs to know to which remote terminal a DL message needs to be forwarded. Therefore, the network device needs to add an adaptation layer to the DL message, and an identity of the remote terminal is indicated through a destination layer-2 identifier (ID) in the adaptation layer. During uplink (UL) transmission, generally, a UL message may carry identity information of a remote terminal, and thus the network device can identify the remote terminal from which the UL message originates by reading the UL message.

However, at present, in a Uu interface between the relay terminal and the network device, an adaptation layer is added by default to both a UL message carried on a CCCH and a DL message carried on the CCCH. However, for a UL message, the network device can directly identify a remote terminal from which the UL message originates. As a result, additional coding and decoding of the adaptation layer are caused, which can increase unnecessary system complexity.

SUMMARY

The present disclosure provides a method for message transmission, a method for message reception, a terminal, and a network device. The technical solutions are as follows.

According to an aspect of the present disclosure, a method for message transmission is provided. The method is executed by a relay terminal in sidelink (SL) communication and includes the following. Forward an uplink (UL) message carried on a common control channel (CCCH) to a network device, where the UL message does not include a destination layer-2 identifier (ID), and the destination layer-2 ID indicates an identity of a remote terminal.

According to another aspect of the present disclosure, a method for message reception is provided. The method is executed by a network device and includes the following. Receive a UL message that is carried on a CCCH and forwarded by a relay terminal in SL communication, where the UL message does not include a destination layer-2 ID, and the destination layer-2 ID indicates an identity of a remote terminal. Execute a response operation corresponding to the UL message.

According to another aspect of the present disclosure, a terminal is provided. The terminal includes a processor, a transceiver coupled to the processor, and a memory configured to store executable instructions. The processor is configured to load and execute the executable instructions to cause the terminal to perform the following. Forward an uplink (UL) message carried on a common control channel (CCCH) to a network device, where the UL message does not include a destination layer-2 identifier (ID), and the destination layer-2 ID indicates an identity of a remote terminal.

According to another aspect of the present disclosure, a network device is provided. The network device includes a processor, a transceiver coupled to the processor, and a memory configured to store executable instructions. The processor is configured to load and execute the executable instructions to cause the network device to perform the following. Receive a UL message that is carried on a CCCH and forwarded by a relay terminal in SL communication, where the UL message does not include a destination layer-2 ID, and the destination layer-2 ID indicates an identity of a remote terminal. The executing module is configured to execute a response operation corresponding to the UL message.

BRIEF DESCRIPTION OF THE DRAWINGS

To describe the technical solutions in the implementations of the present disclosure more clearly, the following briefly introduces the accompanying drawings required for describing the implementations. Apparently, the accompanying drawings in the following description illustrate merely some implementations of the present disclosure, and a person of ordinary skill in the art can derive other accompanying drawings from these accompanying drawings without creative efforts.

DETAILED DESCRIPTION

Figure 1:
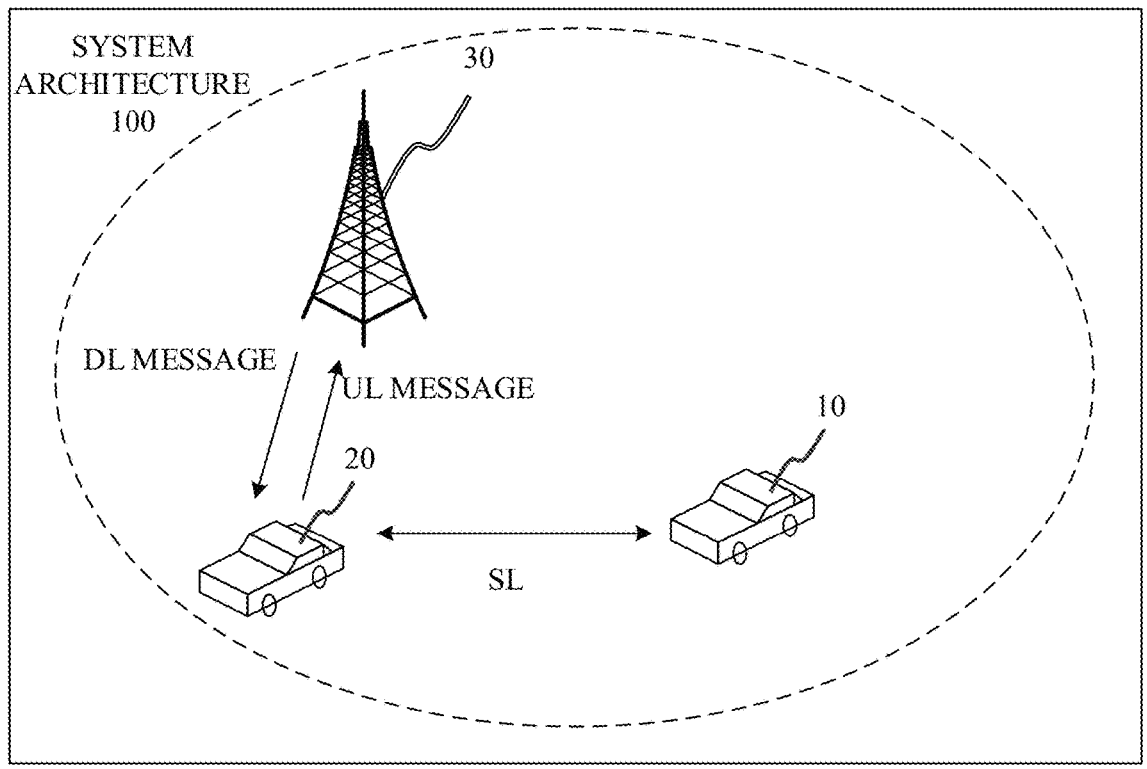
FIG. 1 is a network architecture diagram of a communication system according to an exemplary implementation of the present disclosure.

In order to make the objectives, technical solutions, and advantages of the present disclosure clearer, implementations of the present disclosure are further described in detail below with reference to the accompanying drawings.

In long term evolution (LTE) in release (Rel)-13, sidelink (SL) discovery is defined as a procedure in which a terminal supporting SL discovery can discover other terminal(s) in proximity through using evolved universal terrestrial radio access (E-UTRA) to directly communicate with other terminals via a PC5 interface. SL discovery can be supported in the case where the terminal is served by E-UTRAN and in the case where the terminal is out of E-UTRA coverage. Only a public safety terminal supporting a proximity based service (ProSe) can perform SL discovery in the case of being located out of E-UTRA coverage. For SL discovery of the public safety terminal, an allowed frequency is preconfigured for the terminal and used by the terminal even if the terminal is out of E-UTRA coverage on the frequency. The frequency preconfigured may be the same as a frequency of a public safety carrier.

Notification handling of an upper layer and authorization for monitoring of a discovery message are as follows.

Contents of a discovery message are transparent to an access stratum (AS), and there is no distinction between an SL discovery model and an SL discovery type in the AS. However, a higher layer may inform whether a discovery broadcast transmitted through SL is related to public safety or related to non-public safety. The higher layer may also inform whether discovery announcement and monitoring are related to relay-terminal discovery or other public safety discovery.

The terminal may involve in, according to configuration of a base station (for example, eNodeB (eNB)), broadcasting and monitoring of a discovery message in a Uu idle state and a radio resource control (RRC) connection state. The terminal can broadcast and monitor a discovery message of the terminal under half-duplex constraints.

The terminal involving in broadcasting and monitoring of a discovery message can maintain a current universal time coordinated (UTC) time. The terminal involving in broadcasting may transmit a discovery message. The discovery message may be generated according to a ProSe protocol, where a UTC time when the discovery message is transmitted is taken into consideration. For the terminal for monitoring, a message is provided according to the ProSe protocol, and the message is verified with a received UTC time provided by a ProSe function.

In order to perform synchronization, the terminal involving in broadcasting of a discovery message may serve as a synchronization source by transmitting a sidelink broadcast channel (SBCCH) and a synchronization signal based on resource information of a synchronization signal provided in a system information block (SIB) 19.

There are three range classes for authorization of a discovery message. An applicable range level of a terminal can be provided by authorization of an upper layer. A maximum transmit power allowed per range level is defined in an SIB 19. The terminal can use an applicable and allowed maximum transmit power corresponding to the range level of the terminal authorized, and based on the maximum transmit power, an upper limit for transmit power determined based on an open loop power control parameter(s) can be set.

A remote terminal can perform radio link (RL) measurement at a PC5 interface, and PC5 link quality and a higher-layer defined criteria are used for ProSe terminal-to-network relay selection and reselection. If the PC5 link quality exceeds a configuration threshold (preconfigured or provided by the eNB), the relay terminal may be deemed as suitable for the remote terminal. The remote terminal selects a terminal that satisfies the higher-layer defined criteria and has the optimal PC5 link quality from all terminals each suitable to be a relay terminal as a finally selected relay terminal.

For layer-2 terminal-to-network relay, an adaptation layer sits on a radio link control (RLC) sub-layer for a control plane and a user plane at a Uu interface between a relay terminal and a 5G base station (5G Node B, gNodeB/gNB). A Uu service data adaptation protocol (SDAP)/packet data convergence protocol (PDCP) and an RRC are terminated between a remote terminal and an gNB, while an RLC, a multiple access channel (MAC), and a port physical layer (PHY) are terminated in each link (i.e., a link between the remote terminal and the relay terminal and a link between the relay terminal and the eNB).

An uplink (UL) link for layer-2 terminal-to-network relay is as follows.

A Uu adaption layer of the relay terminal can support UL bearer mapping between PC5 RLC channels, which is used for relay on a Uu path of a relay terminal and release a Uu RLC channel. For a UL relay service, different end-to-end bearers (such as a signalling radio bearer (SRB) and a data radio bearer (DRB)) of a remote terminal and/or different remote terminals can perform N:1 mapping and data multiplexing on a Uu RLC channel.

The Uu adaption layer can be configured to support an identifier (ID) of a remote terminal for a UL service (multiplex data from multiple remote terminals). A Uu radio bearer of the remote terminal and identity information of the remote terminal are included in the Uu adaptation layer of UL, so that the gNB can enable data packets received by a particular packet data convergence protocol (PDCP) entity associated with the Uu radio bearer of the remote terminal to be associated with each other.

Downlink (DL) for layer-2 terminal to network relay is as follows.

A Uu adaptation layer can be configured to support DL bearer mapping at the eNB to map an end-to-end radio bearer (e.g., SRB, DRB) of a remote terminal to a Uu RLC channel via a Uu path of a relay terminal. The Uu adaptation layer can be configured to support DL N:1 bearer mapping and data multiplexing between a Uu RLC channel on the Uu path of the relay terminal and multiple end-to-end radio bearers (e.g., SRB, DRB) of a remote terminal and/or different remote terminals.

The Uu adaption layer needs to support an ID of a remote terminal for DL service. Identity information of a Uu radio bearer of the remote terminal and identity information of the remote terminal need to be put into the Uu adaption layer by the gNB for DL, so that the relay terminal can map data packets received from the Uu radio bearer of the remote terminal to a relevant PC5 RLC channel.

Methods provided in the implementations of the present disclosure can be applied to a relay terminal and a network device that can determine identity information of a remote terminal via an adaptation layer.

FIG. 1 is a schematic diagram of a system architecture according to an implementation of the present disclosure. The system architecture may include a remote terminal 10, a relay terminal 20, and a network device 30.

Generally, there may be multiple remote terminals 10, and one or more remote terminals 10 may be distributed in a cell managed by each network device 30. The remote terminal 10 may include various devices having a wireless communication function such as a handheld device, a vehicle-mounted device, a wearable device, a computing device, or other processing devices connected to a wireless modem, and various forms of user equipment, a mobile station (MS), and the like. For ease of illustration, the foregoing devices are collectively referred to as a remote terminal.

Generally, there may be multiple relay terminals 20, and one or more relay terminals 20 may be distributed in a cell managed by each network device 30. The relay terminal 20 may include various devices having a wireless communication function such as a handheld device, a vehicle-mounted device, a wearable device, a computing device, or other processing devices connected to a wireless modem, and various forms of user equipment, an MS, and the like. For ease of illustration, the foregoing devices are collectively referred to as a relay terminal.

The network device 30 is a device for providing wireless communication functions for the remote terminal 10 and the relay terminal 20. The network device 30 may include various forms of a macro base station, a micro base station, a relay station, an access point, and so on. In systems adopting different radio access technologies, names of the network device 30 may be different, for example, in a 5G new radio (NR) system, the network device 30 is referred to as a 5G base station (5G Node B, gNodeB/gNB).

A connection can be established between the remote terminal 10 and the relay terminal 20 through an SL, and the remote terminal 10 and the relay terminal 20 can communicate with each other through a direct connection communication interface (such as a PC5 interface). The relay terminal 20 can broadcast a message(s) of a network device to the remote terminal through an SL, thereby implementing network relay. Communication data transmission can be directly performed between the remote terminal 10 and the relay terminal 20 through an SL, which is different from reception or transmission of communication data through a network device in a conventional cellular system, and has the characteristics of short time delay, low overhead, etc., and is suitable for communication between two terminals close in geographical position (such as a vehicle-mounted device and other peripheral devices close in geographical position). The network device 30 and the relay terminal 20 can communicate with each other by using a certain air technology, for example, a Uu interface.

Figure 2:
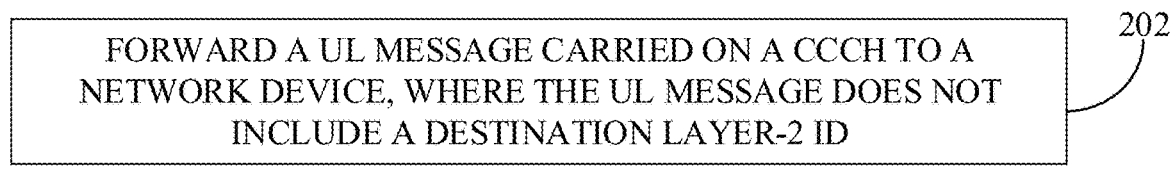
FIG. 2 is a flow chart of a method for message transmission according to an exemplary implementation of the present disclosure.

FIG. 2 is a flow chart of a method for message transmission according to an implementation of the present disclosure. The method in FIG. 2 is illustrated by taking that the method is applied to the relay terminal in the communication system illustrated in FIG. 1 as an example. The method includes the following.

At 202, forward a UL message carried on a common control channel (CCCH) to a network device, where the UL message does not include a destination layer-2 ID.

The relay terminal can establish a connection with a remote terminal through an SL, and the relay terminal can directly communicate with the remote terminal through the SL. The relay terminal can communicate with the network device (for example, a base station), and the remote terminal can communicate with the network device through forwarding of a message(s) of the network device by the relay terminal.

The UL message is a message that is forwarded by the relay terminal and needs to be transmitted to the network device from the remote terminal, where the UL message is carried on the CCCH. Generally, the relay terminal may fill the destination layer-2 ID into an adaption layer for the UL message, to indicate to the network device a remote terminal in a cell from which the UL message originates, so that the network device can determine a source from which the UL message originates. The UL message does not include the destination layer-2 ID, which can be understood as that the adaption layer for the UL message does not include the destination layer-2 ID, that is, the relay device does not add the destination layer-2 ID to the adaption layer for the UL message. The destination layer-2 ID can identify the remote terminal and indicate the identity of the remote terminal. The destination layer-2 ID is allocated by a network side in a wireless communication network. Exemplarily, the UL message may include an RRC setup request (RRCSetupRequest), an RRC resume request (RRCResumeRequest), an RRC resume request 1 (RRCResumeRequest1), and an RRC reconfiguration complete message (RRCReconfigurationcomplete).

In conclusion, according to the method provided in the implementation, the UL message not including the destination layer-2 ID is forwarded to the network device, so that handling of the adaption layer for the UL message by the network device can be avoided, and additional encoding of the adaptation layer by the relay device and additional decoding of the adaptation layer by the network device can be avoided, thereby reducing system complexity.

Figure 3:
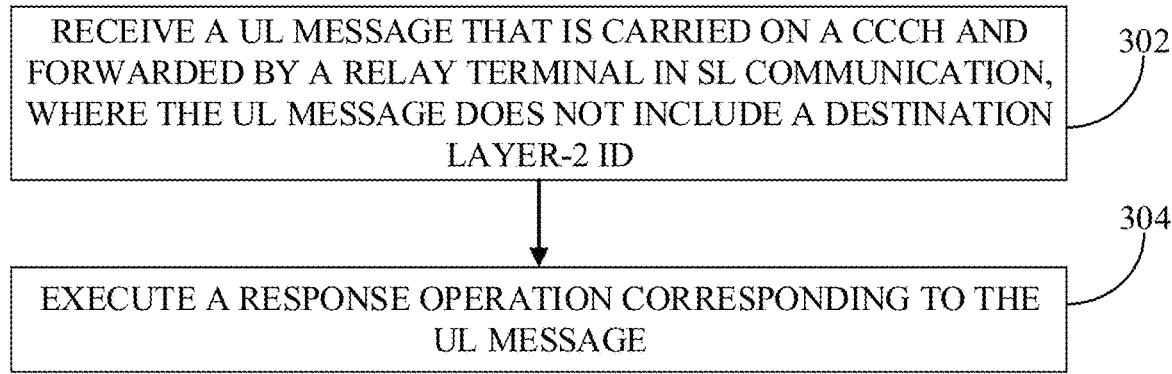
FIG. 3 is a flow chart of a method for message reception according to an exemplary implementation of the present disclosure.

FIG. 3 is a flow chart of a method for message reception according to an implementation of the present disclosure. The method in FIG. 3 is illustrated by taking that the method is applied to the network device in the communication system illustrated in FIG. 1 as an example. The method includes the following.

At 302, receive a UL message that is carried on a CCCH and forwarded by a relay terminal in SL communication, where the UL message does not include a destination layer-2 ID.

The SL communication refers to communication performed through an SL. The relay terminal can establish a connection with a remote terminal through an SL, and the relay terminal and the remote terminal can directly communicate with each other through the SL. The relay terminal can communicate with the network device, and the remote terminal can communicate with the network device through forwarding of a message(s) of the network device by the relay terminal.

The UL message is a message that is forwarded by the relay terminal and needs to be transmitted to the network device from the remote terminal, where the UL message is carried on the CCCH. The destination layer-2 ID indicates the identity of the remote terminal. Generally, the relay terminal may fill the destination layer-2 ID into an adaption layer for the UL message. The UL message does not include the destination layer-2 ID, which can be understood as that the adaption layer for the UL message does not include the destination layer-2 ID, that is, the relay terminal does not add the destination layer-2 ID to the adaption layer for the UL message.

At 304, execute a response operation corresponding to the UL message.

Upon reception of the UL message, the network device can parse the UL message, and in the case where the UL message does not include the destination layer-2 ID, it can be deemed as that the UL message does not include the adaptation layer, and handling of the adaption layer for the UL message by the network device can be avoided.

In conclusion, according to the method provided in the implementation, by means of receiving the UL message that is forwarded by the relay terminal and does not include the destination layer-2 ID, handling of the adaption layer for the UL message by the network device can be avoided, and additional decoding of the adaptation layer by the network device can be avoided, thereby reducing system complexity.

Optionally, the relay terminal can forward different UL messages to the network device to reduce the complexity of the wireless network system.

The first type is as follows.

Figure 4:
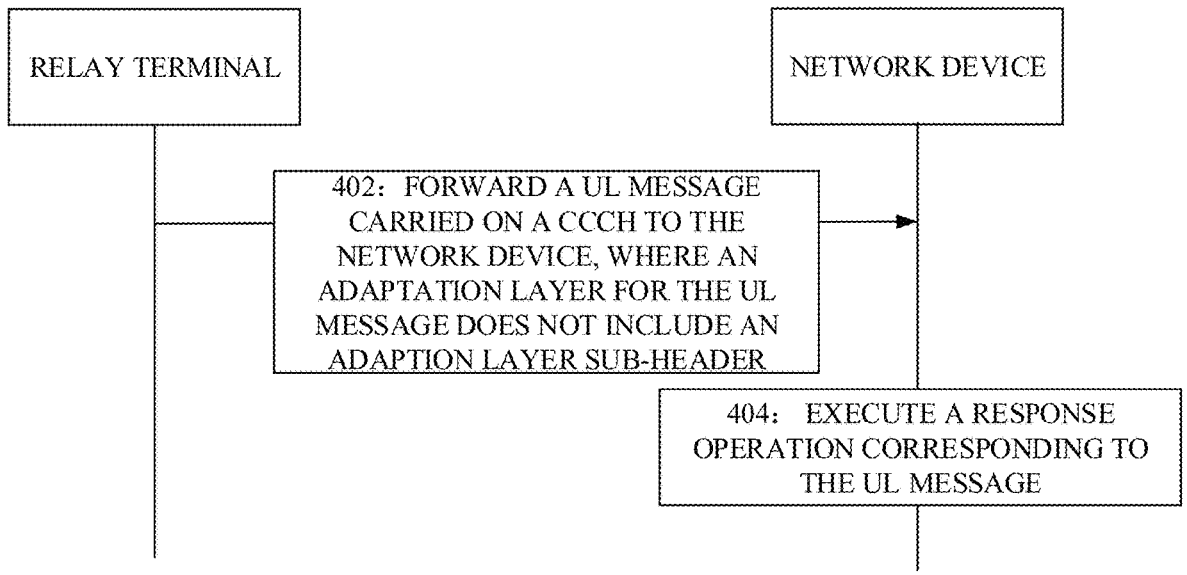
FIG. 4 is a flow chart of a method for message reception according to an exemplary implementation of the present disclosure.

FIG. 4 is a flow chart of a method for message reception according to an implementation of the present disclosure. The method in FIG. 4 is illustrated by taking that the method is applied to the communication system illustrated in FIG. 1 as an example. The method includes the following.

At 402, the relay terminal forwards a UL message carried on a CCCH to the network device, where an adaption layer for the UL message does not include an adaptation layer sub-header.

The adaptation layer sub-header of the adaptation layer is information added to the adaption layer when the relay device encodes the adaptation layer and used when the network device decodes the adaptation layer. The adaption layer for the UL message does not include the adaptation layer sub-header, that is, during transmission of the UL message, the relay terminal does not add the adaptation layer sub-header to the adaption layer for the UL message, that is, the adaptation layer is directly skipped.

At 404, the network device executes a response operation corresponding to the UL message.

In response to the adaption layer for the UL message not including the adaptation layer sub-header, the network device may skip parsing of the adaptation layer. The network device can determine whether the UL message received carries the adaptation layer sub-header by reading a resource block identifier (RB ID) carried in an SDAP layer of the UL message. For example, if the network device identifies that the message is SRB0 according to an SDAP sub-header, the network device determines that the message does not carry the adaptation layer sub-header, and skips parsing of the adaptation layer.

In conclusion, according to the method provided in the implementation, by means of forwarding to the network device the UL message of which the adaptation layer does not include the adaptation layer sub-header, the network device can skip parsing of the adaptation layer, and additional encoding of the adaption layer by the relay device and additional decoding of the adaption layer of the network device can be avoided, thereby reducing system complexity.

The second type is as follows.

Figure 5:
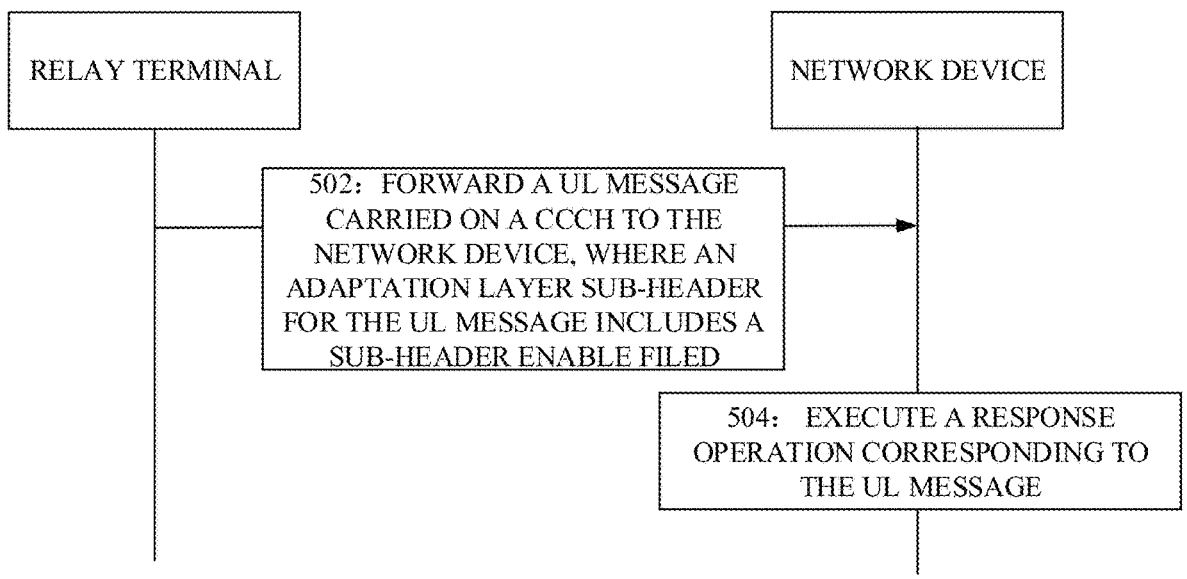
FIG. 5 is a flow chart of a method for message reception according to an exemplary implementation of the present disclosure.

FIG. 5 is a flow chart of a method for message reception according to an implementation of the present disclosure. The method in FIG. 5 is illustrated by taking that the method is applied to the communication system illustrated in FIG. 1 as an example. The method includes the following.

At 502, the relay terminal forwards a UL message carried on a CCCH to the network device, where an adaptation layer sub-header for the UL message includes a sub-header enable field.

The sub-header enable field is added to the adaptation layer sub-header for the UL message by the relay terminal, and the sub-header enable field is filled with a disenable value, for example 1. The disenable value filled in the sub-header enable field indicates that the adaptation layer sub-header is in a disenabled state. Optionally, in the case where additional decoding of the adaptation layer does not need to be avoided, the sub-header enable field is filled with a default value, for example 0. The default value filled in the sub-header enable field indicates that the adaptation layer sub-header is in an enabled state.

At 504, the network device executes a response operation corresponding to the UL message.

During parsing the UL message by the network device, in the case where the network device reads that the sub-header enable field in the adaptation layer sub-header for the UL message is filled with the disenable value, the network device does not parse the adaptation layer sub-header, and in the case where the network device reads that the sub-header enable field in the adaptation layer sub-header for the UL message is filled with the default value, the network device determines that the relay terminal has activated an adaptation layer function, and in this case, the network device needs to parse the adaptation layer sub-header. The sub-header enable field, the value in the sub-header enable field, and an operation corresponding to the value are defined by the network side.

In conclusion, according to the method provided in the implementation, by forwarding to the network device a UL message of which the sub-header enable field is filled with the disenable value, parsing of the adaption layer sub-header by the network device can be avoided, and an additional decoding of the adaptation layer by the network device can be avoided, thereby reducing system complexity.

The third type is as follows.

Figure 6:
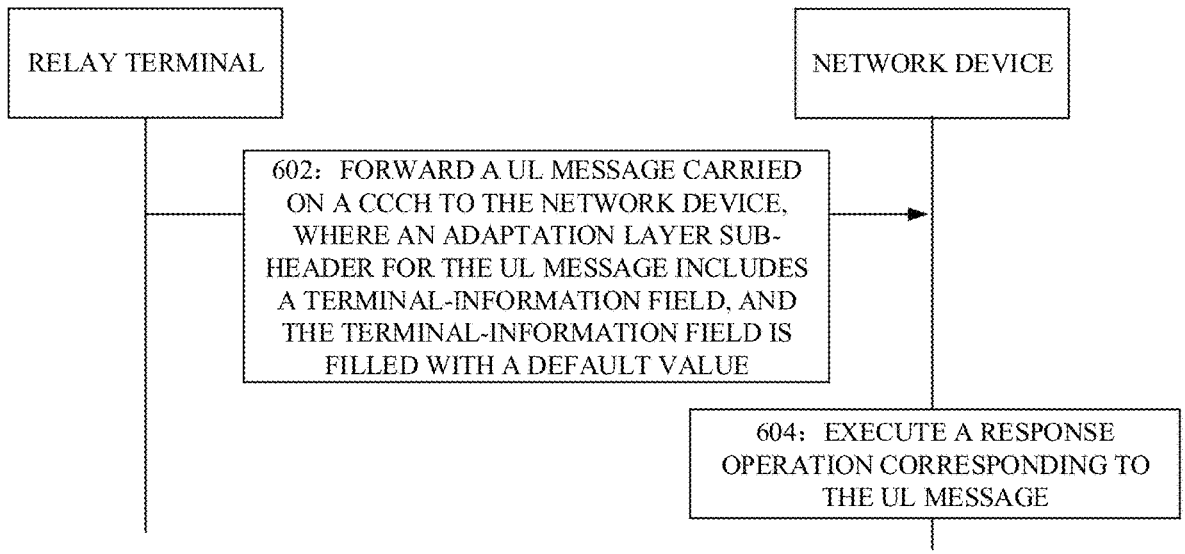
FIG. 6 is a flow chart of a method for message reception according to an exemplary implementation of the present disclosure.

FIG. 6 is a flow chart of a method for message reception according to an implementation of the present disclosure. The method in FIG. 6 is illustrated by taking that the method is applied to the communication system illustrated in FIG. 1 as an example. The method includes the following.

At 602, the relay terminal forwards a UL message carried on a CCCH to the network device, where an adaptation layer sub-header for the UL message includes a terminal-information field, and the terminal-information field is filled with a default value.

The adaptation layer sub-header for the UL message includes the terminal-information field, and the default value is filled into the terminal-information field when the relay terminal transmits the UL message. Optionally, information filled in the terminal-information field by the relay terminal can also be a destination address ID of the relay terminal or identity information (such as a radio network temporary identity (RNTI)) of the relay terminal. The default value can be 1 or 0, and the terminal-information field is filled up with the default value. Generally, the terminal-information field is filled with a destination layer-2 ID to indicate to the network device a remote terminal from which the UL message originates. However, the default value can indicate stop of parsing of the adaptation layer sub-header.

At 604, the network device executes a response operation corresponding to the UL message.

Upon reception of the UL message, the network device can read the adaptation layer sub-header. In response to determining that the terminal-information field is filled with the default value through parsing the terminal-information field, the network device considers that no identity information of the remote terminal is read, and in this case, the network device stops parsing the adaptation layer sub-header.

In conclusion, according to the method provided in the implementation, by means of forwarding to the network device the UL message of which the terminal-information field is filled with the default value, the network device can stop parsing the adaptation layer sub-header, and thus additional decoding of the adaptation layer by the network device can be avoided, thereby reducing system complexity.

Figure 7:
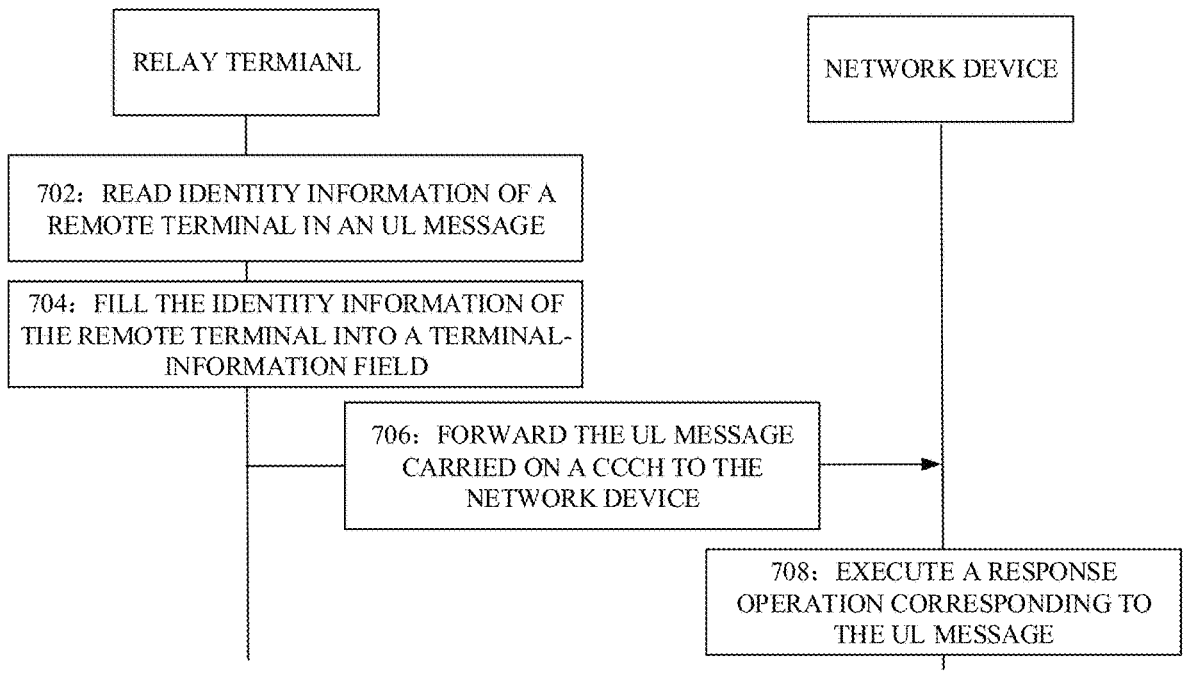
FIG. 7 is a flow chart of a method for message reception according to an exemplary implementation of the present disclosure.

Optionally, the relay terminal can also forward another UL message that carries the identity of the remote terminal to the network device:

FIG. 7 is a flow chart of a method for message reception according to an implementation of the present disclosure. The method in FIG. 7 is illustrated by taking that the method is applied to the communication system illustrated in FIG. 1 as an example. The method includes the following.

At 702, the relay terminal reads identity information of the remote terminal in a UL message.

The identity information of the remote terminal is located in another information field outside an adaptation layer, for example, may be an RNTI, which may specifically be temporary C-RNTI. The identity information of the remote terminal is information capable of indicating an identity of the remote terminal except a destination layer-2 ID.

At 704, the relay terminal fills the identity information of the remote terminal into a terminal-information field.

An adaptation layer sub-header for the UL message includes the terminal-information field. Generally, the destination layer-2 ID is filled into the terminal-information field, but in the case where the relay terminal fills the identity information of the remote terminal into the terminal-information field, the relay terminal does not fill the destination layer-2 ID in the terminal-information field.

Optionally, when a first length is smaller than a second length, the relay terminal fills the identity information into the terminal-information field and supplements the terminal-information field with a default value (for example, 0 or 1). When the first length is equal to the second length, the relay terminal fills the identity information into the terminal-information field. When the first length is greater than the second length, the relay terminal fills information of the second length in the identity information into the terminal-information field. The first length is a length of the identity information of the remote terminal, and the second length is a length of the terminal-information field. When the first length is greater than the second length, the relay terminal first extracts information of the second length from the identity information, for example, extracts information of the second length from the first part of the identity information or information of the second length from the latter part of the identity information, and then fills the information of the second length into the terminal-information field.

At 706, the relay terminal forwards the UL message carried on a CCCH to the network device.

The terminal-information field in the adaptation layer sub-header for the UL message is filled with the identity information of the remote terminal.

At 708, the network device executes a response operation corresponding to the UL message.

The length of the identity information of the remote terminal filled in the terminal-information field is equal to or smaller than a length of the identity information of the remote terminal in another information field outside the adaptation layer. Upon reception of the UL message, the network device can obtain the identity information of the remote terminal by descrambling the UL message, for example, when the network device obtains an RNTI of the remote terminal, the network device obtains the identity information of the remote terminal. The network device can determine the identity of the remote terminal according to the identity information of the remote terminal so as to determine a source from which the UL message originates.

Optionally, the network device can also transmit a DL message carried on the CCCH to the relay terminal. The DL message is a message that is forwarded by the relay terminal and needed to be transmitted to the remote terminal from the network device. An adaptation layer for the DL message includes the identity information of the remote terminal. When the relay terminal needs to forward to the remote terminal the DL message carried on the CCCH, the relay terminal needs to determine the identity of the remote terminal that is to receive the DL message, so as to perform directional transmission. According to the identity information of the remote terminal included in the adaptation layer for the DL message, the relay terminal can determine the identity of the remote terminal that is to receive the DL message and then transmit the DL message to the corresponding remote terminal. In this process, the network device needs to add the identity information of the remote terminal to the terminal-information field of the adaptation layer, where the identity information may be the destination layer-2 ID, or may be other information capable of identifying the identity of the remote terminal.

It is to be noted that when the relay terminal forwards a broadcast control channel (BCCH) message, a paging control channel (PCCH), message, a dedicated control channel (DCCH) message, and a dedicated transmission channel (DTCH) message, in the case where the message does not carry the identity information of the remote terminal, it can be ensured that the network device can accurately parse the message not carrying the identity information of the remote terminal, encoding of the adaption layer and decoding of the adaptation layer can also be avoided according to the above method.

In conclusion, according to the method provided in the implementation, the relay terminal fills the identity information of the remote terminal into the terminal-information field, and the identity information of the remote terminal is information capable of indicating the identity of the remote terminal except the destination layer-2 ID, and thus a manner in which the identity of the remote terminal that transmits the UL message can be indicated to the network device without using the destination layer-2 ID can be provided.

Figure 8:
FIG. 8 is a block diagram of an apparatus for message transmission according to an exemplary implementation of the present disclosure.

FIG. 8 is a block diagram of an apparatus for message transmission according to an implementation of the present disclosure. As illustrated in FIG. 8, the apparatus 80 includes a transmitting module 801 configured to forward a UL message carried on a CCCH to a network device, where the UL message does not include a destination layer-2 ID, and the destination layer-2 ID indicates an identity of a remote terminal.

In an optional design, an adaption layer for the UL message does not include an adaptation layer sub-header.

In an optional design, the adaptation layer sub-header for the UL message includes a sub-header enable field, where the sub-header enable field is filled with a disenable value, and the disenable value indicates that the adaptation layer sub-header is in a disenabled state.

In an optional design, the adaptation layer sub-header for the UL message includes a terminal-information field, where the terminal-information field is filled with a default value, and the default value indicates stop of parsing of the adaptation layer sub-header.

Figure 9:
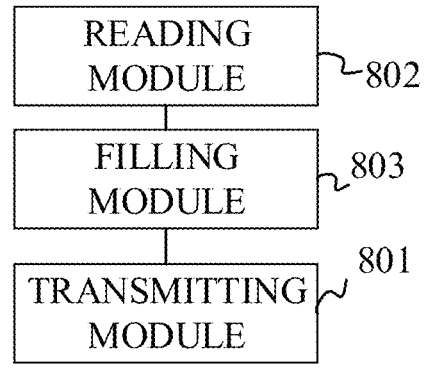
FIG. 9 is a block diagram of an apparatus for message transmission according to an exemplary implementation of the present disclosure.

In an optional design, the adaptation layer sub-header for the UL message includes the terminal-information field. As illustrated in FIG. 9, the apparatus 80 may further include a reading module 802 and a filling module 803. The reading module 802 is configured to read identity information of the remote terminal in the UL message, where the identity information of the remote terminal is located in another information field outside the adaptation layer, and the identity information of the remote terminal is information capable of indicating the identity of the remote terminal except the destination layer-2 ID. The filling module 803 is configured to fill the identity information of the remote terminal into the terminal-information field.

In an optional design, the filling module 803 is configured to fill the identity information into the terminal-information field and supplement the terminal-information field with a default value when a first length is less than a second length, fill the identity information into the terminal-information field when the first length is equal to the second length, and fill information of the second length in the identity information into the terminal-information field when the first length is greater than the second length. The first length is a length of the identity information of the remote terminal, and the second length is a length of the terminal-information field.

In an optional design, the transmitting module 801 is configured to forward a DL message carried on the CCCH to the remote terminal, where an adaptation layer for the DL message includes the identity information of the remote terminal.

Figure 10:
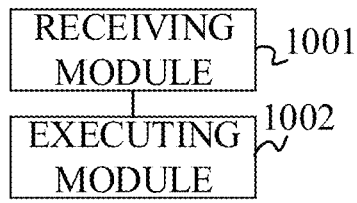
FIG. 10 is a block diagram of an apparatus for message reception according to an exemplary implementation of the present disclosure.

FIG. 10 is a block diagram of an apparatus for message reception according to an implementation of the present disclosure. As illustrated in FIG. 10, the apparatus 100 includes a receiving module 1001 and an executing module 1002. The receiving module 1001 is configured to receive a UL message that is carried on a CCCH and forwarded by a relay terminal in SL communication, where the UL message does not include a destination layer-2 ID, and the destination layer-2 ID indicates an identity of a remote terminal. The executing module 1002 is configured to execute a responding operation corresponding to the UL message.

In an optional design, the executing module 1002 is configured to skip parsing of an adaption layer for the UL message in response to the adaption layer for the UL message not including an adaptation layer sub-header.

In an optional design, the adaptation layer sub-header for the UL message includes a sub-header enable field. The executing module 1002 is configured to skip parsing of the adaptation layer sub-header in response to the sub-header enable field being filled with a disenable value.

In an optional design, the adaptation layer sub-header for the UL message includes a terminal-information field. The executing module 1002 is configured to stop parsing the adaptation layer sub-header in response to determining that the terminal-information field is filled with a default value through parsing the terminal-information field.

In an optional design, the adaptation layer sub-header for the UL message includes the terminal-information field, where identity information of the remote terminal is filled in the terminal-information field, the identity information of the remote terminal is located in another information field outside the adaptation layer, and the identity information of the remote terminal is information capable of indicating the identity of the remote terminal except the destination layer-2 ID. The executing module 1002 is configured to determine the identity of the remote terminal according to the identity information of the remote terminal.

In an optional design, a length of the identity information of the remote terminal filled in the terminal-information field is equal to or smaller than a length of the identity information of the remote terminal in the other information field outside the adaptation layer.

Figure 11:
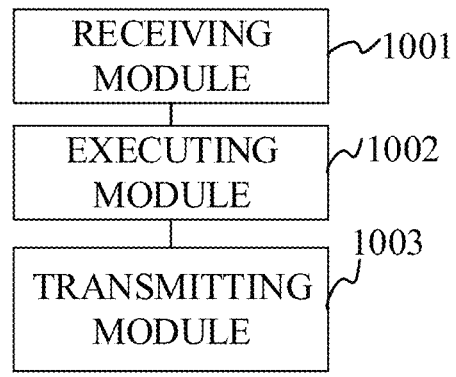
FIG. 11 is a block diagram of an apparatus for message reception according to an exemplary implementation of the present disclosure.

In an optional design, as illustrated in FIG. 11, the apparatus 100 further includes a transmitting module 1003 configured to transmit a DL message carried on a CCCH to a relay terminal, where an adaptation layer for the DL message includes the identity information of the remote terminal.

It is to be noted that, in the case where the apparatus provided in the foregoing implementations implement functions of the apparatus, division of the foregoing functional modules is used as an example for illustration. In actual applications, the foregoing functions may be allocated to different functional modules for implementation according to actual requirements, that is, a content structure of the apparatus is divided into different functional modules to implement all or a part of the foregoing functions.

With respect to the apparatus in the foregoing implementations, the specific manner in which the modules execute the operations has been described in detail in the implementations of the method, and is not described in detail herein.

Figure 12:
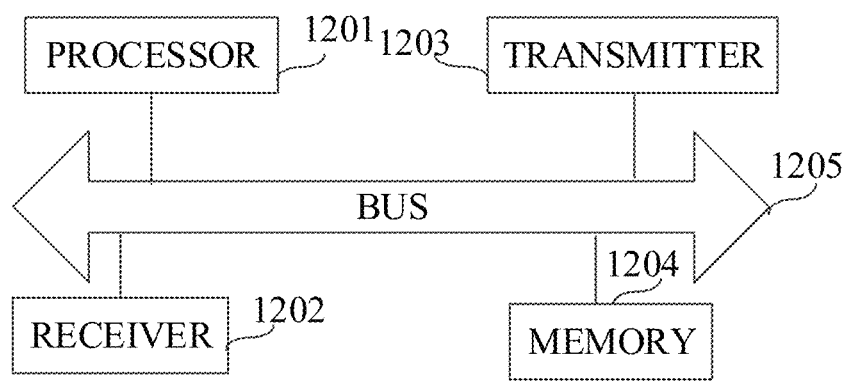
FIG. 12 is a schematic structural diagram of a terminal according to an exemplary implementation of the present disclosure.

FIG. 12 is a schematic structural diagram of a terminal according to an exemplary implementation of the present disclosure. The terminal 120 includes a processor 1201, a receiver 1202, a transmitter 1203, a memory 1204, and a bus 1205.

The processor 1201 includes one or more processing cores, and the processor 1201 executes various function applications and information processing by running software programs and modules.

The receiver 1202 and the transmitter 1203 may be implemented as a communication component, where the communication component may be a communications chip.

The memory 1204 is connected to the processor 1201 through a bus 1205.

The memory 1204 may be configured to store at least one instruction, and the processor 1201 is configured to execute the at least one instruction to implement each operation in the foregoing method implementation.

In addition, the memory 1204 may be implemented by any type of volatile or non-volatile memory or a combination thereof. The volatile or non-volatile memory includes, but is not limited to, a magnetic disk or an optical disk, an electrically erasable programmable read only memory (EE-PROM), an erasable programmable read only memory (EPROM), a static random access memory (SRAM), a read-only memory (ROM), a magnetic memory, a flash memory, a programmable read-only memory (PROM).

Figure 13:
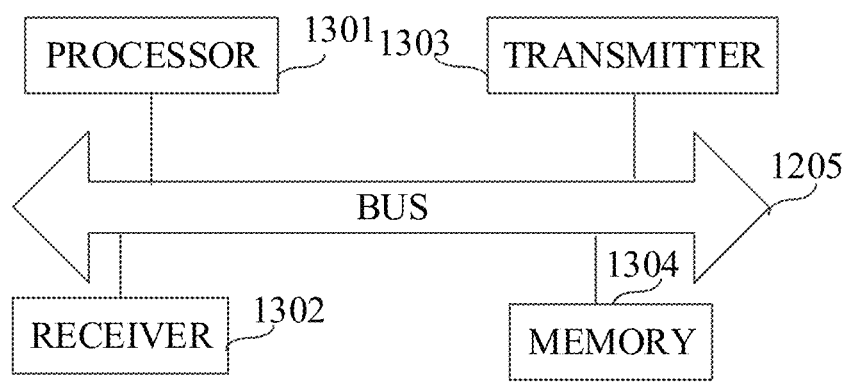
FIG. 13 is a schematic structural diagram of a network device according to an exemplary implementation of the present disclosure.

FIG. 13 is a schematic structural diagram of a network device according to an exemplary implementation of the present disclosure. The network device 130 includes a processor 1301, a receiver 1302, a transmitter 1303, a memory 1304, and a bus 1305.

The processor 1301 includes one or more processing cores. The processor 1301 executes various function applications and information processing by running software programs and modules.

The receiver 1302 and the transmitter 1303 may be implemented as a communication component, and the communication component may be a communications chip.

The memory 1304 is connected to the processor 1301 through a bus 1305.

The memory 1304 may be configured to store at least one instruction, and the processor 1301 is configured to execute the at least one instruction to implement each operation in the foregoing method implementations.

In addition, the memory 1304 may be implemented by any type of volatile or non-volatile memory or a combination thereof. The volatile or non-volatile memory includes, but is not limited to, a magnetic disk or an optical disk, an EEPROM, a PROM, a SRAM, a ROM, a magnetic memory, a flash memory, a PROM.

In an exemplary implementation, a computer-readable storage medium is further provided. The computer-readable storage medium stores at least one instruction, at least one program, a code set, or an instruction set. The at least one instruction, the at least one program, the code set, or the instruction set are loaded and executed by the processor, so as to implement the method for message transmission performed by the relay terminal or the method for message reception performed by the network device provided in each of the foregoing method implementations.

Implementations of the present disclosure further provide a chip. The chip includes a programmable logic circuit and/or a program instruction. When the chip runs on a terminal, the chip is configured to implement the foregoing method for message transmission executed by a relay terminal or the foregoing method for message reception executed by a network device.

The present disclosure also provides a computer program product. When the computer program product runs on a terminal device, a relay terminal executes the described method for message transmission, or a network device executes the described method for message reception.

Those skilled in the art should appreciate that in one or more of the above examples, the functions described in the implementations of the present disclosure may be implemented by hardware, software, firmware or any combination thereof. When implemented using software, the functions may be stored in a computer-readable medium or transmitted as one or more instructions or codes in the computer-readable medium. The computer-readable medium may include a computer storage medium and a communication medium, where the communication medium includes any medium that facilitates transfer of a computer program from one place to another. The storage medium may be any available medium that can be accessed by a general purpose or special purpose computer.

The foregoing descriptions merely illustrate exemplary implementations of the present disclosure, and are not intended to limit the present disclosure. Any modification, equivalent replacement, and improvement made within the spirit and principle of the present disclosure shall belong to the scope of protection of the present disclosure.

What is claimed is:

1. A method for message transmission, the method being executed by a relay terminal in sidelink (SL) communication and comprising:
   forwarding an uplink (UL) message carried on a common control channel (CCCH) to a network device;
   wherein an adaptation layer sub-header for the UL message comprises a terminal-information field, and the method further comprises:
      reading identity information of a remote terminal in the UL message, wherein the identity information of the remote terminal is located in another information field outside an adaptation layer for the UL message, and the identity information of the remote terminal is information capable of indicating an identity of the remote terminal except a destination layer-2 identifier (ID); and
      filling the identity information of the remote terminal into the terminal-information field.

2. The method of claim 1, wherein filling the identity information of the remote terminal into the terminal-information field comprises:
   filling the identity information of the remote terminal into the terminal-information field and supplementing the terminal-information field with a default value when a first length is less than a second length;
   filling the identity information of the remote terminal into the terminal-information field when the first length is equal to the second length; and
   filling information of the second length in the identity information of the remote terminal into the terminal-information field when the first length is greater than the second length;
   wherein the first length is a length of the identity information of the remote terminal, and the second length is a length of the terminal-information field.

3. The method of claim 1, further comprising:
   forwarding a downlink (DL) message carried on the CCCH to the remote terminal, wherein an adaptation layer for the DL message comprises the identity information of the remote terminal.

4. A method for message reception, the method being executed by a network device and comprising:
   receiving an uplink (UL) message that is carried on a common control channel (CCCH) and forwarded by a relay terminal in sidelink (SL) communication; and
   executing a response operation corresponding to the UL message;
   wherein an adaptation layer sub-header for the UL message comprises a terminal-information field, wherein the terminal-information field is filled with identity information of a remote terminal, and the identity information of the remote terminal is located in another information field outside an adaptation layer for the UL message, and the identity information of the remote terminal is information capable of indicating an identity of the remote terminal except a destination layer-2 identifier (ID); and
   executing the response operation corresponding to the UL message comprises:
      determining the identity of the remote terminal according to the identity information of the remote terminal.

5. The method of claim 4, wherein a length of the identity information of the remote terminal filled in the terminal-information field is equal to or smaller than a length of identity information of the remote terminal in the another information field outside the adaptation layer.

6. The method of claim 4, further comprising:
transmitting a downlink (DL) message carried on the CCCH to the relay terminal, wherein an adaptation layer for the DL message comprises the identity information of the remote terminal.

7. A relay terminal, comprising:
a processor;
a transceiver coupled to the processor;
a memory configured to store executable instructions;
wherein the processor being configured to load and execute the executable instructions to cause the terminal to:
  forward an uplink (UL) message carried on a common control channel (CCCH) to a network device;
wherein an adaptation layer sub-header for the UL message comprises a terminal-information field, and the processor is further configured to load and execute the executable instructions to cause the relay terminal to:
  read identity information of a remote terminal in the UL message, wherein the identity information of the remote terminal is located in another information field outside an adaptation layer for the UL message, and the identity information of the remote terminal is information capable of indicating an identity of the remote terminal except a destination layer-2 identifier (ID); and
  fill the identity information of the remote terminal into the terminal-information field.

8. The relay terminal of claim 7, wherein the processor configured to load and execute the executable instructions to cause the relay terminal to fill the identity information of the remote terminal into the terminal-information field is configured to load and execute the executable instructions to cause the relay terminal to:
  fill the identity information of the remote terminal into the terminal-information field and supplement the terminal-information field with a default value when a first length is less than a second length;
  fill the identity information of the remote terminal into the terminal-information field when the first length is equal to the second length; and
  fill information of the second length in the identity information of the remote terminal into the terminal-information field when the first length is greater than the second length;
wherein the first length is a length of the identity information of the remote terminal, and the second length is a length of the terminal-information field.

9. A network device comprising:
a processor;
a transceiver coupled to the processor;
a memory configured to store executable instructions;
wherein the processor being configured to load and execute the executable instructions to cause the network device to:
  receive an uplink (UL) message that is carried on a common control channel (CCCH) and forwarded by a relay terminal in sidelink (SL) communication; and
  execute a response operation corresponding to the UL message;
wherein an adaptation layer sub-header for the UL message comprises a terminal-information field, wherein the terminal-information field is filled with identity information of a remote terminal, and the identity information of the remote terminal is located in another information field outside an adaptation layer for the UL message, and the identity information of the remote terminal is information capable of indicating an identity of the remote terminal except a destination layer-2 identifier (ID); and
the processor configured to load and execute the executable instructions to cause the network device to execute the response operation corresponding to the UL message is configured to load and execute the executable instructions to cause the network device to:
  determine the identity of the remote terminal according to the identity information of the remote terminal.

10. The network device of claim 9, wherein a length of the identity information of the remote terminal filled in the terminal-information field is equal to or smaller than a length of identity information of the remote terminal in the another information field outside the adaptation layer.

* * * * *